(12) United States Patent
Schneider et al.

(10) Patent No.: US 9,020,957 B1
(45) Date of Patent: Apr. 28, 2015

(54) SYSTEMS AND METHODS FOR ENHANCING SOCIAL NETWORKING CONTENT

(75) Inventors: Scott D. Schneider, Los Angeles, CA (US); Hemant Puri, Milpitas, CA (US)

(73) Assignee: Symantec Corporation, Mountain View, CA (US)

( * ) Notice: Subject to any disclaimer, the term of this patent is extended or adjusted under 35 U.S.C. 154(b) by 427 days.

(21) Appl. No.: 13/408,497

(22) Filed: Feb. 29, 2012

(51) Int. Cl.
*G06F 17/30* (2006.01)
*G06F 7/00* (2006.01)
*G06Q 50/00* (2012.01)

(52) U.S. Cl.
CPC .......... *G06F 17/30705* (2013.01); *G06Q 50/01* (2013.01)

(58) Field of Classification Search
CPC ...................................................... G06Q 50/01
See application file for complete search history.

(56) References Cited

U.S. PATENT DOCUMENTS

| | | | |
|---|---|---|---|
| 7,673,327 B1 * | 3/2010 | Polis et al. | 726/5 |
| 8,429,277 B2 * | 4/2013 | Dale et al. | 709/226 |
| 8,611,929 B1 * | 12/2013 | Vandehey et al. | 455/456.3 |
| 2008/0300937 A1 * | 12/2008 | Allen et al. | 705/7 |
| 2012/0005224 A1 * | 1/2012 | Ahrens et al. | 707/769 |
| 2013/0036171 A1 * | 2/2013 | Gilbert | 709/204 |

* cited by examiner

*Primary Examiner* — Jeffrey A Burke
(74) *Attorney, Agent, or Firm* — ALG Intellectual Property, LLC

(57) ABSTRACT

A computer-implemented method for enhancing social networking content may include 1) identifying social networking content accessed from a social networking site, 2) parsing the social networking content to identify at least one content item that is potentially referenced in at least one of a plurality of social networking sites, 3) searching the plurality of social networking sites for an additional content item that relates to the content item, and 4) enhancing the social networking content with the additional content item. Various other methods, systems, and computer-readable media are also disclosed.

20 Claims, 8 Drawing Sheets

SYSTEMS AND METHODS FOR ENHANCING SOCIAL NETWORKING CONTENT

BACKGROUND

In the information age, people increasingly organize their lives online, store their information in cloud-based applications, and connect with other people via social networking platforms. The various social networking platforms and other cloud-based services may allow users to communicate and/or connect with others in a variety of ways.

Even as the social networking space has matured, many users may maintain multiple social networking accounts. For example, social network platforms may be structured around particular subjects and/or use cases, and may, accordingly, interface with users using varying modalities to provide an optimal experience. Additionally, different users may hold different preferences between competing social networks. Other users with connections to disparate social networking groups may maintain multiple redundant social networking presences in order to stay current with people in their various social spheres.

Unfortunately, the proliferation of social networking services in a user's life may become a burden as the user checks each account for updates. Furthermore, information pertaining to a single subject may be scattered across multiple social networking platforms, leaving the user with a poor interface experience. Accordingly, the instant disclosure identifies a need for systems and methods for enhancing social networking content.

SUMMARY

As will be described in greater detail below, the instant disclosure generally relates to systems and methods for enhancing social networking content by searching through a user's other social networking accounts for information relating to a currently viewed social networking site. In one example, a computer-implemented method for enhancing social networking content may include 1) identifying social networking content accessed from a social networking site, 2) parsing the social networking content to identify at least one content item that is potentially referenced in at least one of a plurality of social networking sites, 3) searching the plurality of social networking sites for an additional content item that relates to the content item, and 4) enhancing the social networking content with the additional content item.

Searching the plurality of social networking sites may include any of a variety of searches. For example, searching the plurality of social networking sites may include 1) searching the plurality of social networking sites for a reference to a person indicated by the content item, 2) searching the plurality of social networking sites for an event indicated by the content item, 3) searching the plurality of social networking sites for a time indicated by the content item, and/or 4) searching the plurality of social networking sites for a topic indicated by the content item. In some examples, searching the plurality of social networking sites may include 1) identifying a user account that accessed the social networking content, 2) identifying a plurality of user accounts for the plurality of social networking sites corresponding to a same user as the user account, 3) identifying a plurality of access credentials for the plurality of user accounts, and 4) searching the plurality of social networking sites using the plurality of access credentials.

In some examples, enhancing the social networking content may include 1) injecting the additional content item into the social networking content and 2) displaying the social networking content enhanced with the injected additional content item. In these examples, injecting the additional content item may include contextualizing the content item in the social networking content with the additional content item. Additionally or alternatively, enhancing the social networking content may include 1) injecting a link to the additional content item into the social networking content and 2) displaying the social networking content enhanced with the injected link to the additional content item. In some embodiments, enhancing the social networking content may include 1) injecting a link to a list of search results including the additional content item into the social networking content and 2) displaying the social networking content enhanced with the injected link to the additional content item. Additionally or alternatively, enhancing the social networking content may include displaying information relating to the additional content item in a toolbar while displaying the social networking content.

In one embodiment, a system for implementing the above-described method may include 1) an identification module programmed to identify social networking content accessed from a social networking site, 2) a parsing module programmed to parse the social networking content to identify at least one content item that is potentially referenced in at least one of a plurality of social networking sites, 3) a search module programmed to search the plurality of social networking sites for an additional content item that relates to the content item, and 4) an enhancement module programmed to enhance the social networking content with the additional content item. The system may also include at least one processor configured to execute the identification module, the parsing module, the searching module, and the enhancing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify social networking content accessed from a social networking site, 2) parse the social networking content to identify at least one content item that is potentially referenced in at least one of a plurality of social networking sites, 3) search the plurality of social networking sites for an additional content item that relates to the content item, and 4) enhance the social networking content with the additional content item.

As will be explained in greater detail below, by searching through a user's other social networking accounts for information relating to a currently viewed social networking site, the systems and methods described herein may leverage potentially valuable information in a user's social networking feeds and/or accounts to enrich and/or contextualize information in a currently used social networking platform. Furthermore, these systems and methods may achieve this benefit while allowing the user to use each social networking platform according to its primary modality.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Figure 1:
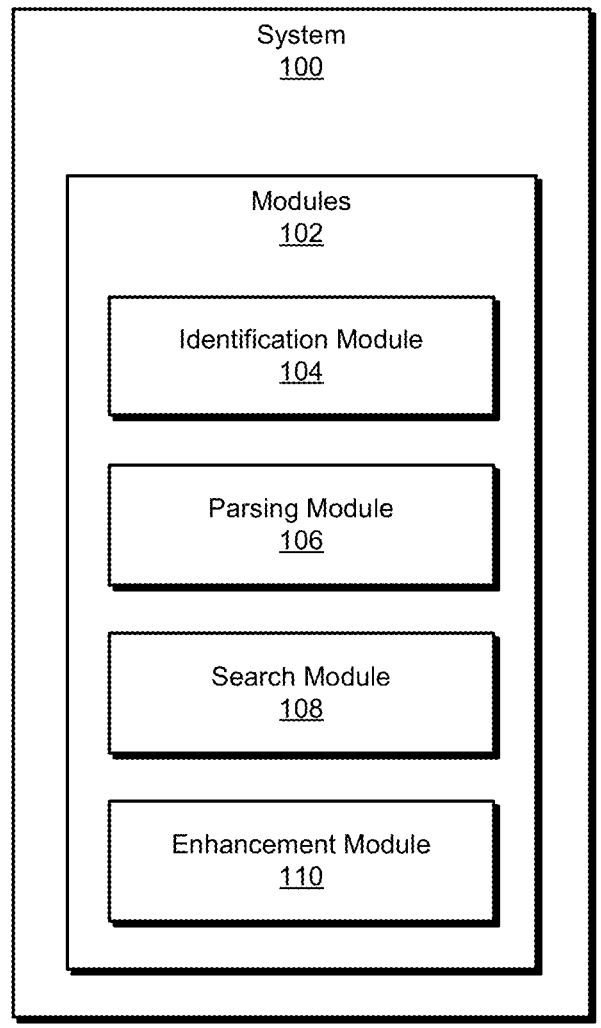
FIG. 1 is a block diagram of an exemplary system for enhancing social networking content.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
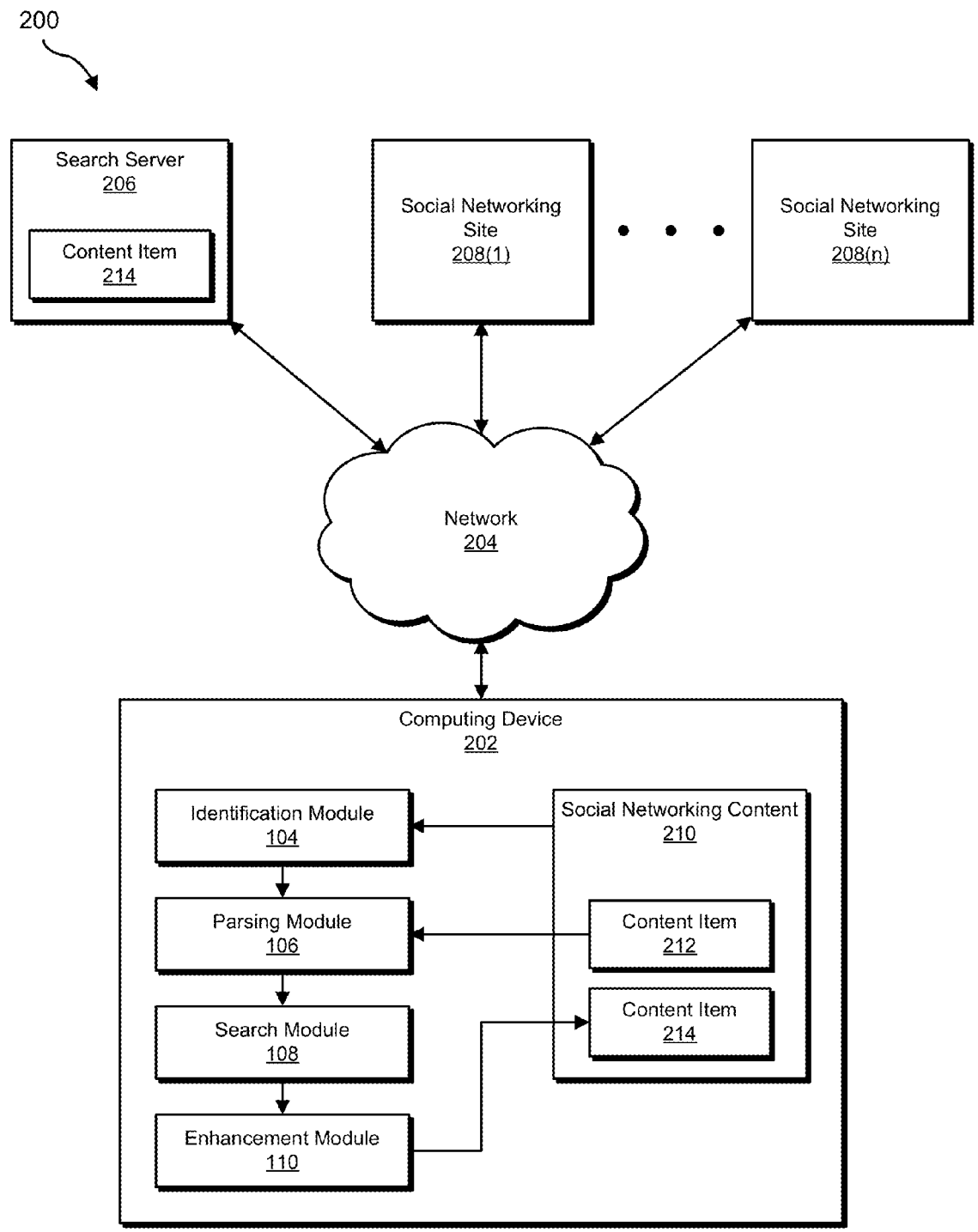
FIG. 2 is a block diagram of an exemplary system for enhancing social networking content.

The following will provide, with reference to FIGS. 1-2, detailed descriptions of exemplary systems for enhancing social networking content. Detailed descriptions of corresponding computer-implemented methods will also be provided in connection with FIG. 3. Detailed descriptions of an exemplary website with enhanced social networking content will be provided in connection with FIGS. 4-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for enhancing social networking content. As illustrated in this figure, exemplary system 100 may include one or more modules 102 for performing one or more tasks. For example, and as will be explained in greater detail below, exemplary system 100 may include an identification module 104 programmed to identify social networking content accessed from a social networking site. Exemplary system 100 may also include a parsing module 106 programmed to parse the social networking content to identify at least one content item that is potentially referenced in at least one of a plurality of social networking sites.

In addition, and as will be described in greater detail below, exemplary system 100 may include a search module 108 programmed to search the plurality of social networking sites for an additional content item that relates to the content item. Exemplary system 100 may also include an enhancement module 110 programmed to enhance the social networking content with the additional content item. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, search server 206, and/or social networking sites 208(1)-(n)), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a search server 206 and social networking sites 208(1)-(n) via a network 204.

In one embodiment, one or more of modules 102 from FIG. 1 may, when executed by at least one processor of computing device 202, facilitate computing device 202 in enhancing social networking content. For example, and as will be described in greater detail below, one or more of modules 102 may cause computing device 202 to 1) identify social networking content 210 accessed from a social networking site (e.g., one of social networking sites 208(1)-(n)), 2) parse social networking content 210 to identify at least one content item 212 that is potentially referenced in at least one of social networking sites 208(1)-(n), 3) search plurality of social networking sites 208(1)-(n) (e.g., directly from computing device 202 and/or via search server 206) for an additional content item 214 that relates to content item 212, and 4) enhance social networking content 210 with content item 214.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 710 in FIG. 7, or any other suitable computing device.

Search server 206 generally represents any type or form of computing device that is capable of facilitating, generating, processing, performing, and/or storing searches of data from one or more Internet sites and/or services. Examples of search server 206 include, without limitation, application servers and database servers configured to provide various database services and/or run certain software applications.

Social networking sites 208(1)-(n) generally represent any type or form of Internet resource, service, platform, and/or computing device that is capable of storing data online and/or sharing data between two or more users. Examples of social networking sites 208(1)-(n) include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing device 202 and server 206.

Figure 3:
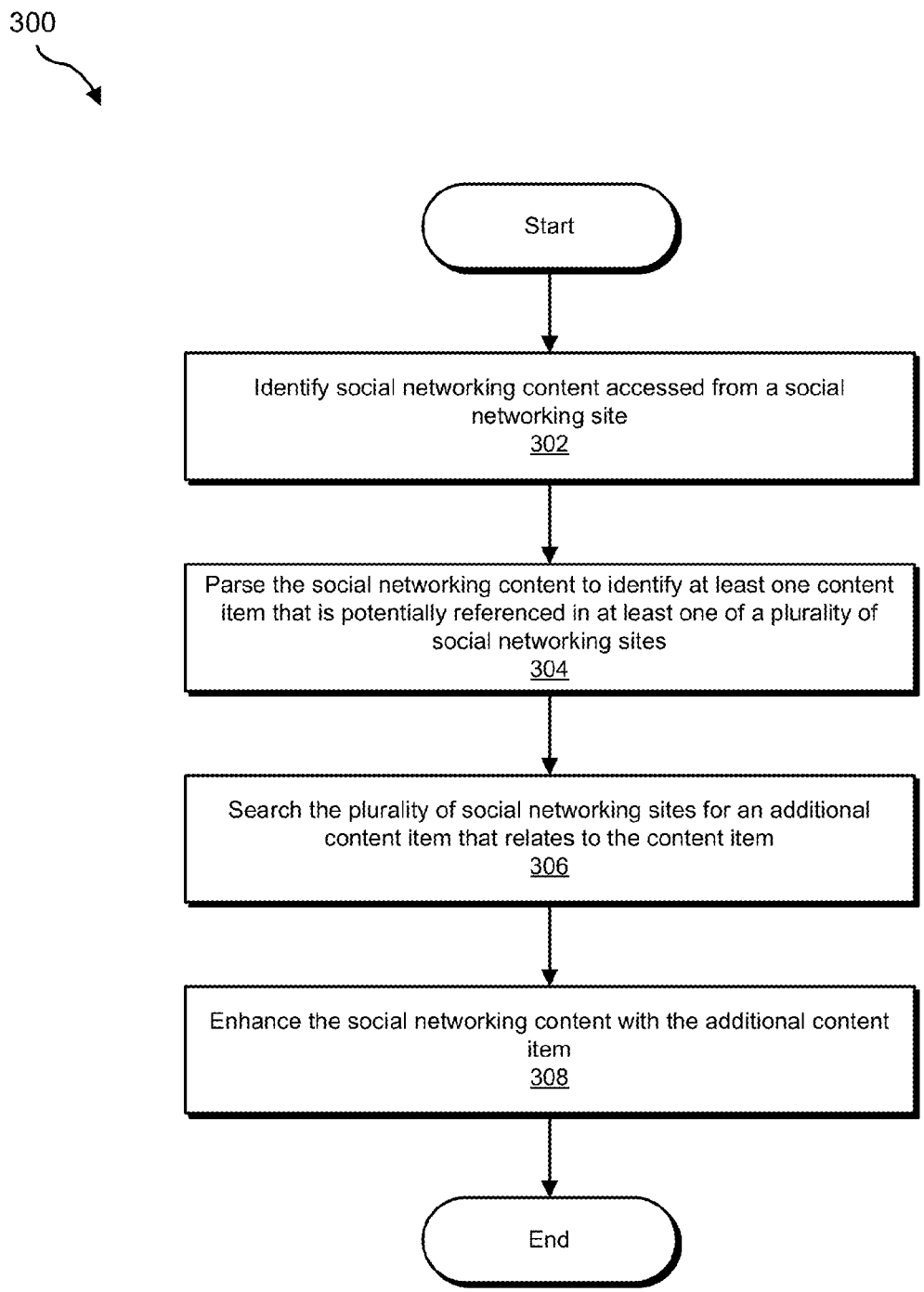
FIG. 3 is a flow diagram of an exemplary method for enhancing social networking content.

FIG. 3 is a flow diagram of an exemplary computer-implemented method 300 for enhancing social networking content. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify social networking content accessed from a social networking site. For example, at step 302 identification module 104 may, as part of computing device 202 in FIG. 2, identify social networking content 210 accessed from a social networking site (e.g., one of social networking sites 208(1)-(n)).

As used herein, the phrase "social networking content" may refer to any content stored by, generated by, organized by, managed by, processed by, and/or provided by a social networking site. As used herein, the phrase "social networking site" may refer to any service, platform, and/or Internet site that manages social connections and/or shares, compiles, formats, and/or broadcasts information based on social connections. Examples of social networking platforms may include FACEBOOK, TWITTER, GOOGLE+, LINKEDIN, FLICKR, LAST.FM, and YELP. In some examples, the phrase "social networking content" may also refer to data hosted by cloud-based applications (e.g., web-based email clients, online calendar applications, online picture albums, etc.) for personal and/or private use.

In some examples, social networking sites may present and/or provide social networking content as a feed. As used herein, the term "feed" may refer to any data format providing updated content related to a subject (e.g., a person, a topic, an organization, etc.). Additionally or alternatively, the term "feed" may refer to a list and/or aggregation of such updates over time. In some examples, the term "feed" may refer to a human-readable feed (e.g., an Internet resource for displaying recent content associated with the feed). Additionally or alternatively, the term "feed" may refer to a computer-readable feed (e.g., an XML document including a list of data objects).

In some examples, a social networking feed may include a public feed. For example, a public social networking data feed and/or the contents thereof may be publicly accessible. Additionally or alternatively, a social networking data feed may include a private feed. For example, access a private social networking data feed may be restricted to a specified list of users, a specified category of users (e.g., members of a social networking site, users within a certain distance on a social networking relationship graph, etc.), or even exclusively to the owner and/or creator of the private social networking data feed.

Identification module 104 may identify the social networking content in any of a variety of contexts. For example, identification module 104 may identify the social networking content within a web page received from the social networking site. In some examples, identification module 104 may intercept the web page (e.g., before the web page is rendered within a web browser). For example, identification module 104 may operate as a part of a web browser plug-in capable of manipulating web pages loaded in the web browser.

Figure 4:
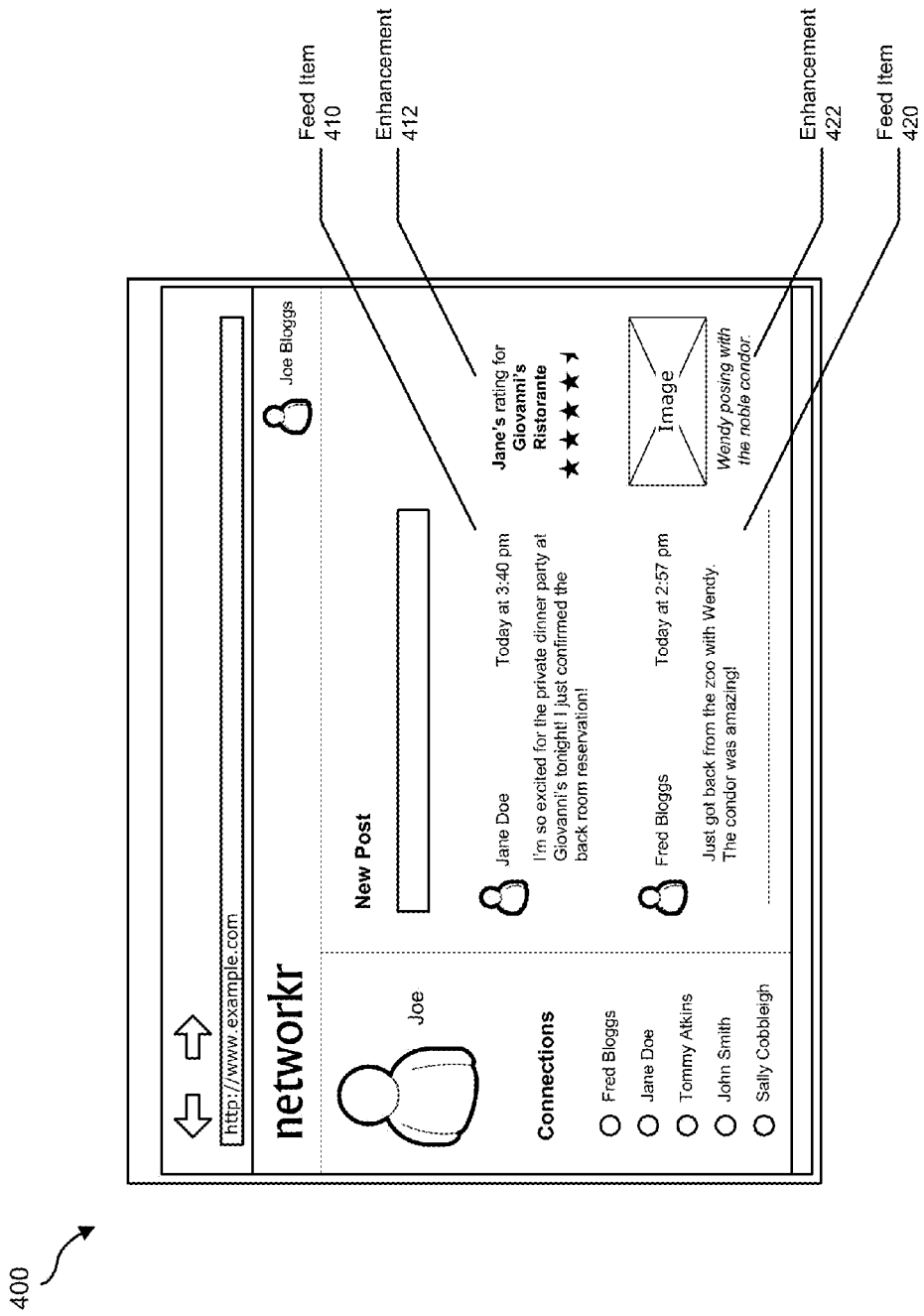
FIG. 4 is an illustration of an exemplary website for enhancing social networking content.

FIG. 4 illustrates an exemplary web page 400. Using FIG. 4 as an example, at step 302 identification module 104 may identify web page 400. Additionally or alternatively, identification module 104 may identify content within web page 400 (e.g., a feed item 410 and/or a feed item 420).

Returning to FIG. 3, at step 304 one or more of the systems described herein may parse the social networking content to identify at least one content item that is potentially referenced in at least one of a plurality of social networking sites. For example, at step 304 parsing module 106 may, as part of computing device 202 in FIG. 2, parse social networking content 210 to identify at least one content item 212 that is potentially referenced in at least one of social networking sites 208(1)-(n).

As used herein, the phrase "content item" may refer to any unit of information found within and/or expressed by the social networking content. For example, the phrase "content item" may refer to a post, a feed item, and/or other suitable social networking data form (e.g., a calendar item, a map, a rating, a picture, a video, a message, etc.). In some examples, the phrase "content item" may refer to a keyword and/or key phrase within a post and/or feed item. Additionally or alternatively, the phrase "content item" may refer to a latent semantic variable inferable from the social networking content (e.g., identifying a topic of the social networking content and/or a post within the social networking content). In some examples, the phrase "content item" may refer to and/or include metadata of a post and/or feed item (e.g., an identifier of the creator of a post, a time of the post, a location of the post, etc.).

Parsing module 106 may parse the social networking content in any of a variety of ways. For example, parsing module 106 may parse the social networking content to identify and/or extract one or more types of entities from the social networking content. For example, parsing module 106 may parse the social networking content to identify people, events, dates, places, organizations, topics, and/or conversations within the social networking content. Additionally or alternatively, parsing module 106 may parse the social networking content for keywords and/or key phrases of potential interest.

Using FIG. 4 as an example, at step 304 parsing module 106 may parse web page 400 to identify feed item 410. Additionally or alternatively, parsing module 106 may parse feed item 410 to identify one or more elements of interest (e.g., that may relate to other social networking content pertaining to other social networking sites) within feed item 410. For example, parsing module 106 may identify "Jane Doe" as a person, "Today at 3:40" as a time, "dinner party" as an event, "Giovanni's" as a business and/or a location, and/or "reservation" as a keyword of potential significance. Likewise, parsing module 106 may parse feed item 420 to identify one or more elements of interest within feed item 420. For example, parsing module 106 may identify "Fred Bloggs" as a person, "Wendy" as a person, "Today at 2:57 pm" as a time, "zoo" as a location, and/or "condor" as a keyword of potential significance.

Returning to FIG. 3, at step 306 one or more of the systems described herein may search the plurality of social networking sites for an additional content item that relates to the content item. For example, at step 306 search module 108 may, as part of computing device 202 in FIG. 2, search plurality of social networking sites 208(1)-(n) (e.g., directly from computing device 202 and/or via search server 206) for an additional content item 214 that relates to content item 212.

The additional content item may relate to the content item in any of a variety of ways. For example, the additional content item may include the content item (e.g., a keyword).

Additionally or alternatively, the additional content item may be equivalent and/or similar to the content item (e.g., a synonym of a keyword). In some examples, the additional content item may include an alternate representation of what the content item represents (e.g., a picture corresponding to a word, a calendar item corresponding to a date, a post corresponding to a person, etc.). In some examples, the content item may include a juxtaposition of two or more elements (e.g., a time and a location, a topic and an organization, two people, etc.).

Search module 108 may search the plurality of social networking sites with any of a variety of searches. For example, search module 108 may search the plurality of social networking sites for a reference to a person indicated by the content item. For example, search module 108 may search the plurality of social networking sites for a mention of the person in a post, a post made by the person, a picture and/or video of the person, a picture and/or video taken by the person, an event invitation sent or accepted by the person, a meeting scheduled by and/or with the person, a review and/or rating submitted by the person, a message sent by, received by, and/or mentioning the person, media consumed by the person, etc.

In some examples, search module 108 may search the plurality of social networking sites for an event indicated by the content item. For example, the content item may include a time, a location, an event name, and/or an activity describing the event. Additionally or alternatively, search module 108 may search the plurality of social networking sites for a time indicated by the content item (e.g., searching for a mention of a time and/or date corresponding to the time indicated by the content item, an event and/or appointment corresponding to the time, and/or a submission to a social networking site at or near the time).

Search module 108 may, additionally or alternatively, search the plurality of social networking sites for a topic indicated by the content item. For example, search module 108 may search the plurality of social networking sites for a keyword included in the content item and/or for keywords relating to the topic.

In some examples, search module 108 may use a user's credentials to access the plurality of social networking sites. For example, search module 108 may 1) identify a user account that accessed the social networking content, 2) identify a plurality of user accounts for the plurality of social networking sites corresponding to a same user as the user account, 3) identify a plurality of access credentials for the plurality of user accounts, and then 4) search the plurality of social networking sites using the plurality of access credentials. Search module 108 may identify the plurality of access credentials in any suitable manner. For example, search module 108 may access a password vault and/or database for the user. Additionally or alternatively, search module 108 may access a password store maintained for the systems and methods described herein (e.g., the user may provide login credentials for the plurality of social networking sites to search module 108 and/or one or more other systems described herein).

Search module 108 may perform the search in any suitable manner. In some examples, search module 108 may access the plurality of social networking sites directly. Additionally or alternatively, search module 108 may submit search information to a separate social networking search engine for searching the plurality of social networking sites.

Using FIG. 4 as an example, at step 306 searching module 108 may search the plurality of social networking sites for additional content relating to feed item 410 and/or one or more elements of feed item 410. For example, search module 108 may search for additional content relating to "Jane Doe" (e.g., social networking content generated by Jane Doe), "Today at 3:40 pm" (e.g., events at or around 3:40 pm), "dinner party" (e.g., posts mentioning a dinner party), "Giovanni's" (e.g., reviews of Giovanni's, check-ins at Giovanni's, etc.), etc. Likewise, searching module 108 may search the plurality of social networking sites for additional content relating to feed item 420 and/or one or more elements of feed item 420. For example, searching module 108 may search for "Fred Bloggs," "Wendy," 2:57 pm, mentions and/or reviews of nearby zoos, "condor," etc.

Returning to FIG. 3, at step 308 one or more of the systems described herein may enhance the social networking content with the additional content item. For example, at step 308 enhancement module 110 may, as part of computing device 202 in FIG. 2, enhance social networking content 210 with content item 214.

Enhancement module 110 may enhance the social networking content with the additional content item in any of a variety of ways. For example, enhancement module 110 may inject the additional content item into the social networking content (e.g., into a web page including the social networking content). Enhancement module 110 may then display the social networking content enhanced with the injected additional content item. In this example, enhancement module 110 may contextualize the content item in the social networking content with the additional content item. For example, the additional content item may provide more details about the content item and/or specify to what the content item refers.

In some examples, enhancement module 110 may enhance the social networking content by injecting a link to the additional content item into the social networking content. Enhancement module 110 may then display the social networking content enhanced with the injected link to the additional content item. For example, enhancement module 110 may inject a link to the additional content item on one of the social networking sites within the plurality of social networking sites. In some examples, enhancement module 110 may add the link next to the content item. Additionally or alternatively, enhancement module 110 may mark up the content item to include the link.

In one example, enhancement module 110 may enhance the social networking content with the additional content item by injecting a link to a list of search results including the additional content item into the social networking content. Enhancement module 110 may then display the social networking content enhanced with the injected link to the additional content item. For example, as mentioned earlier, search module 108 may submit a search query to a social networking search engine configured to search the plurality of social networking sites. Accordingly, enhancement module 110 may return a link to the search results of the query to the social networking search engine.

In some examples, enhancement module 110 may enhance the social networking content with the additional content item by displaying information relating to the additional content item (e.g., a link to the additional content item) in a toolbar while displaying the social networking content. For example, as explained earlier, the social networking content may be rendered within a web browser. Accordingly, the web browser may include a toolbar (e.g., including and/or operating as a part of enhancement module 110) configured to display the additional content item and/or a link to the additional content item.

Using FIG. 4 as an example, enhancement module 110 may enhance web page 400 by modifying web page 400 to include an enhancement 412 (e.g., alongside feed item 410). For example, search module 108 may have searched the plurality of social networking sites for "Jane Doe" and "Giovanni's" and identified a rating and/or review of a restaurant called "Giovanni's Ristorante" on a review site (e.g., on which Joe Bloggs and Jane Doe are friends). Search module 108 may have then extracted the rating for display by enhancement module 110. Similarly, enhancement module 110 may modify web page 400 to include an enhancement 422 (e.g., based on search results from a photo sharing site from a search generated for feed item 420 using "Wendy" and "condor").

Figure 5:
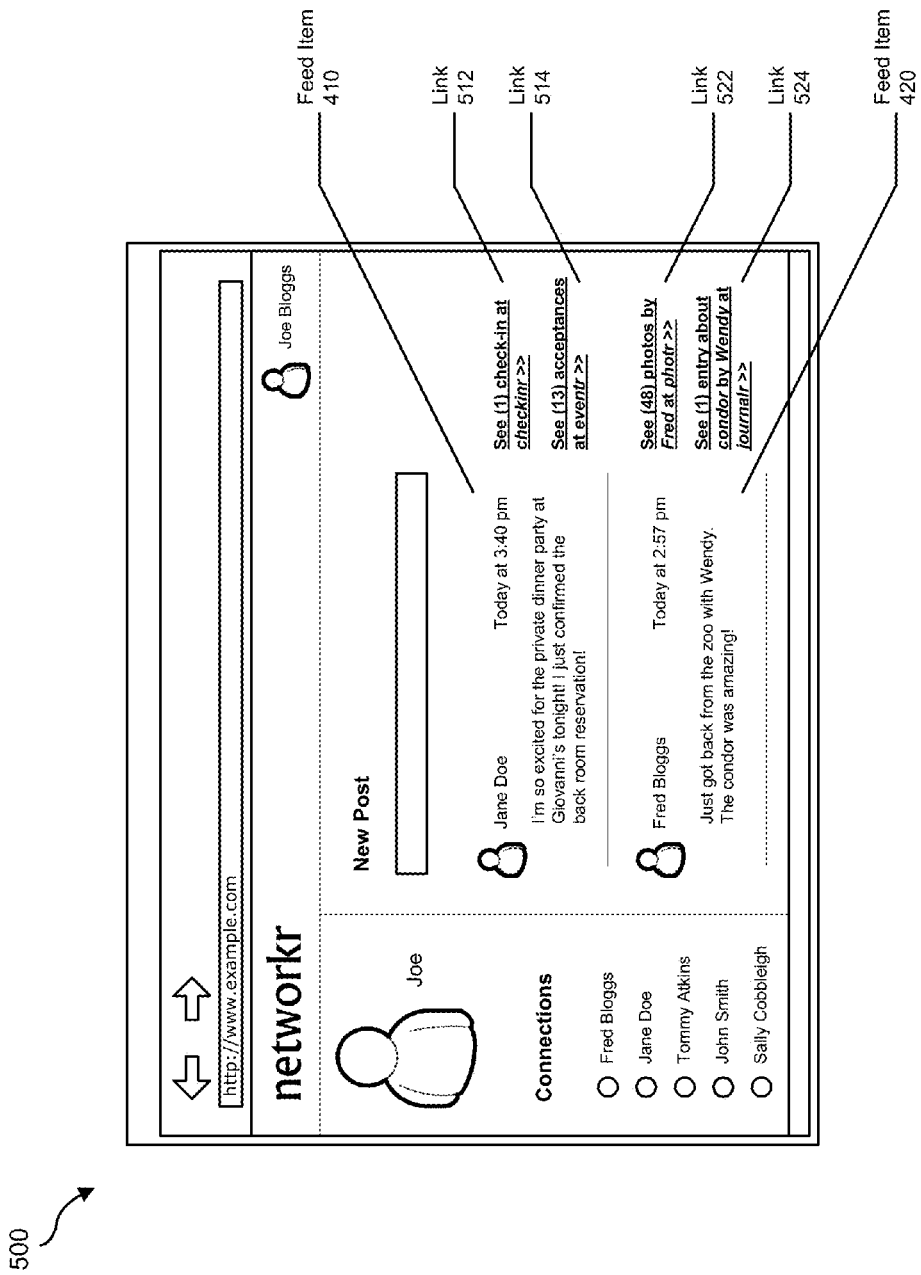
FIG. 5 is an illustration of an exemplary website for enhancing social networking content.

FIG. 5 illustrates an exemplary web page 500. As shown in FIG. 5, enhancement module 110 may enhance web page 500 by modifying web page 500 to include a link 512 and a link 514 corresponding to feed item 410. For example, link 512 may link to a site for sharing check-ins at locations and/or events. In this example, link 512 may link to a check-in on the site for Giovanni's, a recent check-in at a location by Jane Doe, etc. Likewise, link 514 may link to a site for organizing events. Accordingly, link 514 may link to a list of acceptances to a private dinner party at Giovanni's. A link 522 may link to a photograph sharing site. Accordingly, link 522 may link to a recent photo album including "zoo" in a title and/or label. A link 524 may link to a blogging site. Accordingly, link 524 may link to a recent blog entry by Wendy including the word "condor."

Figure 6:
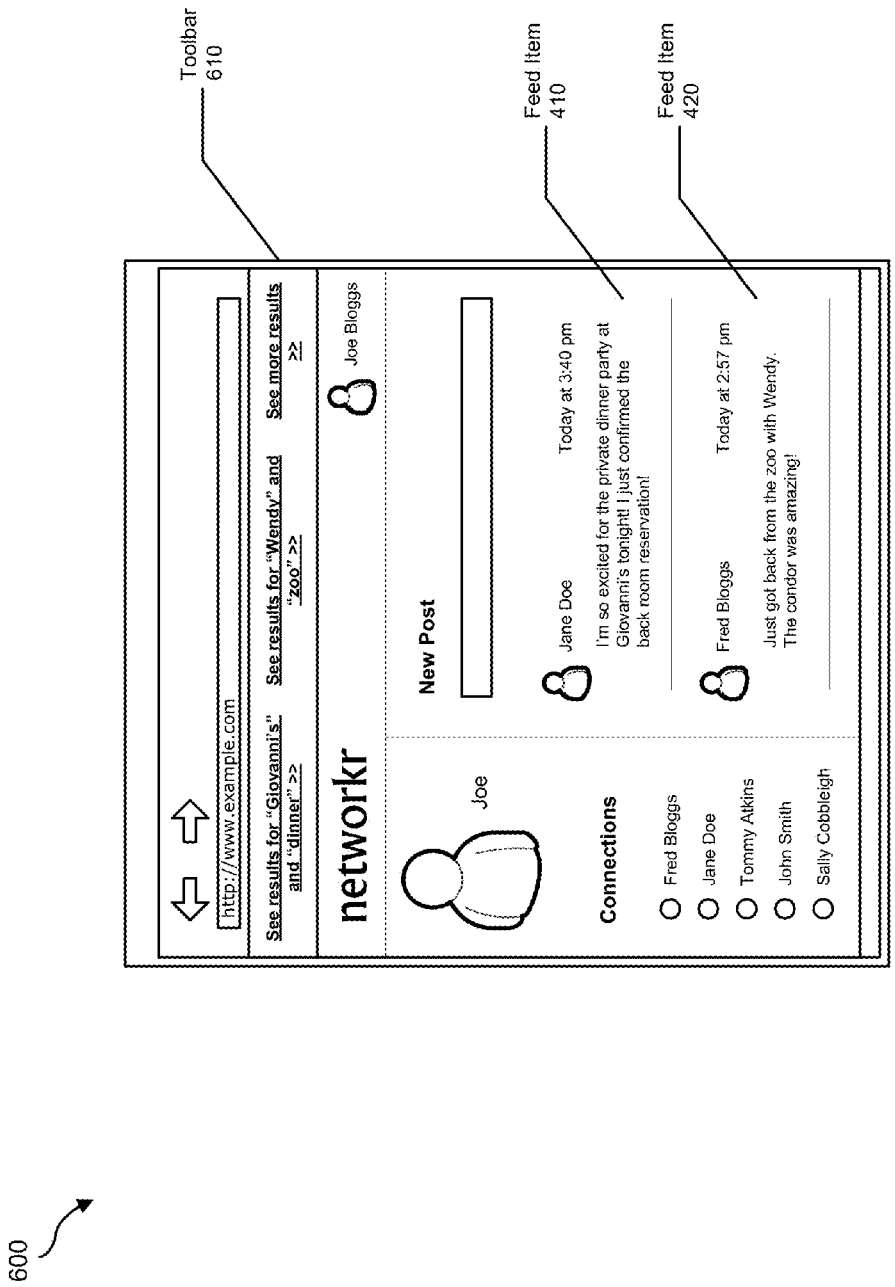
FIG. 6 is an illustration of an exemplary website for enhancing social networking content.

FIG. 6 illustrates an exemplary web page 600. As shown in FIG. 6, enhancement module 110 may enhance web page 600 by displaying links to search results in a toolbar 610. For example, toolbar 610 may display links to search results of a social networking search engine using elements of feed items 410 and 420 as inputs to the query.

As explained above, by searching through a user's other social networking accounts for information relating to a currently viewed social networking site, the systems and methods described herein may leverage potentially valuable information in a user's social networking feeds and/or accounts to enrich and/or contextualize information in a currently used social networking platform. Furthermore, these systems and methods may achieve this benefit while allowing the user to use each social networking platform according to its primary modality.

Figure 7:
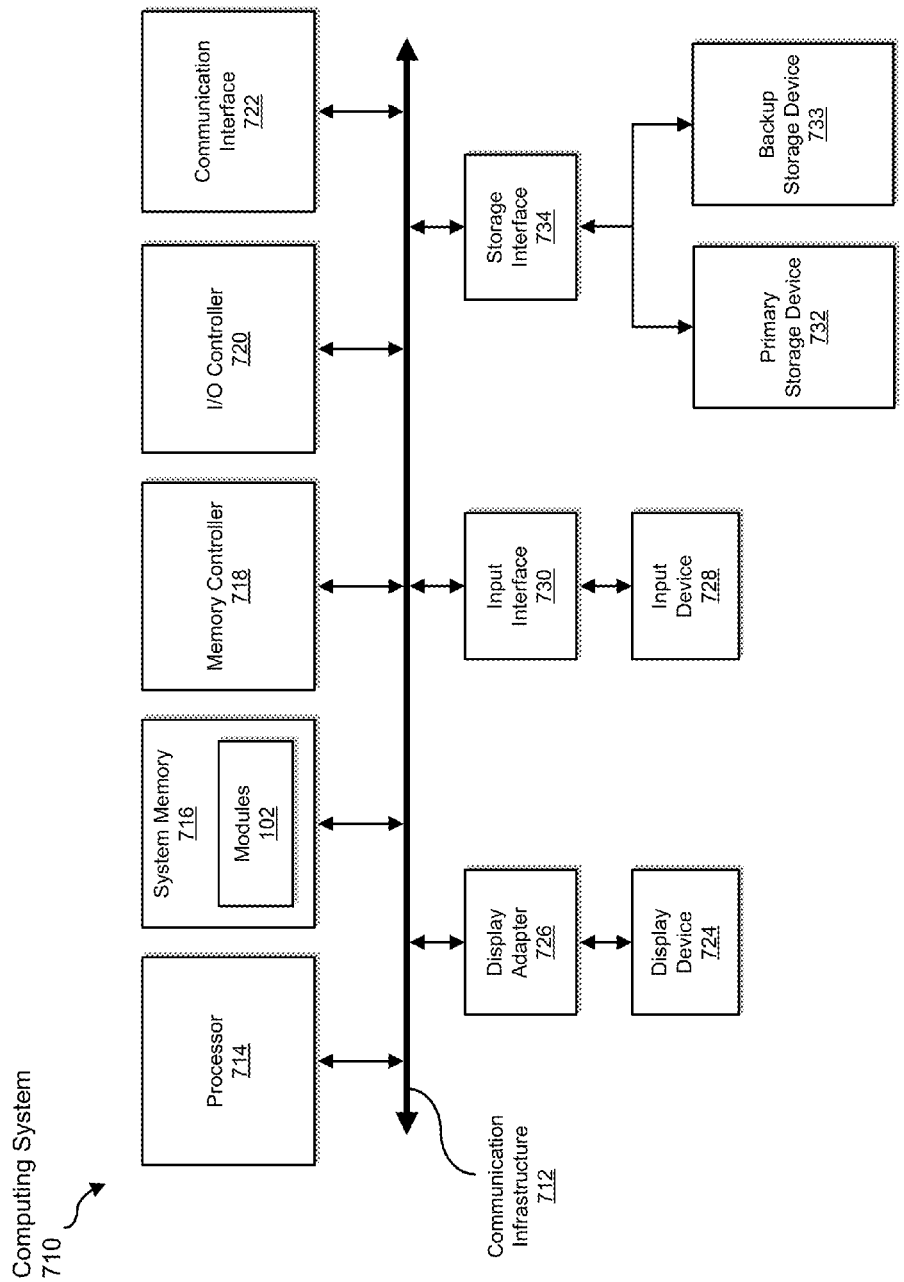
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the identifying, parsing, searching, enhancing, injecting, contextualizing, and displaying steps described herein. All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
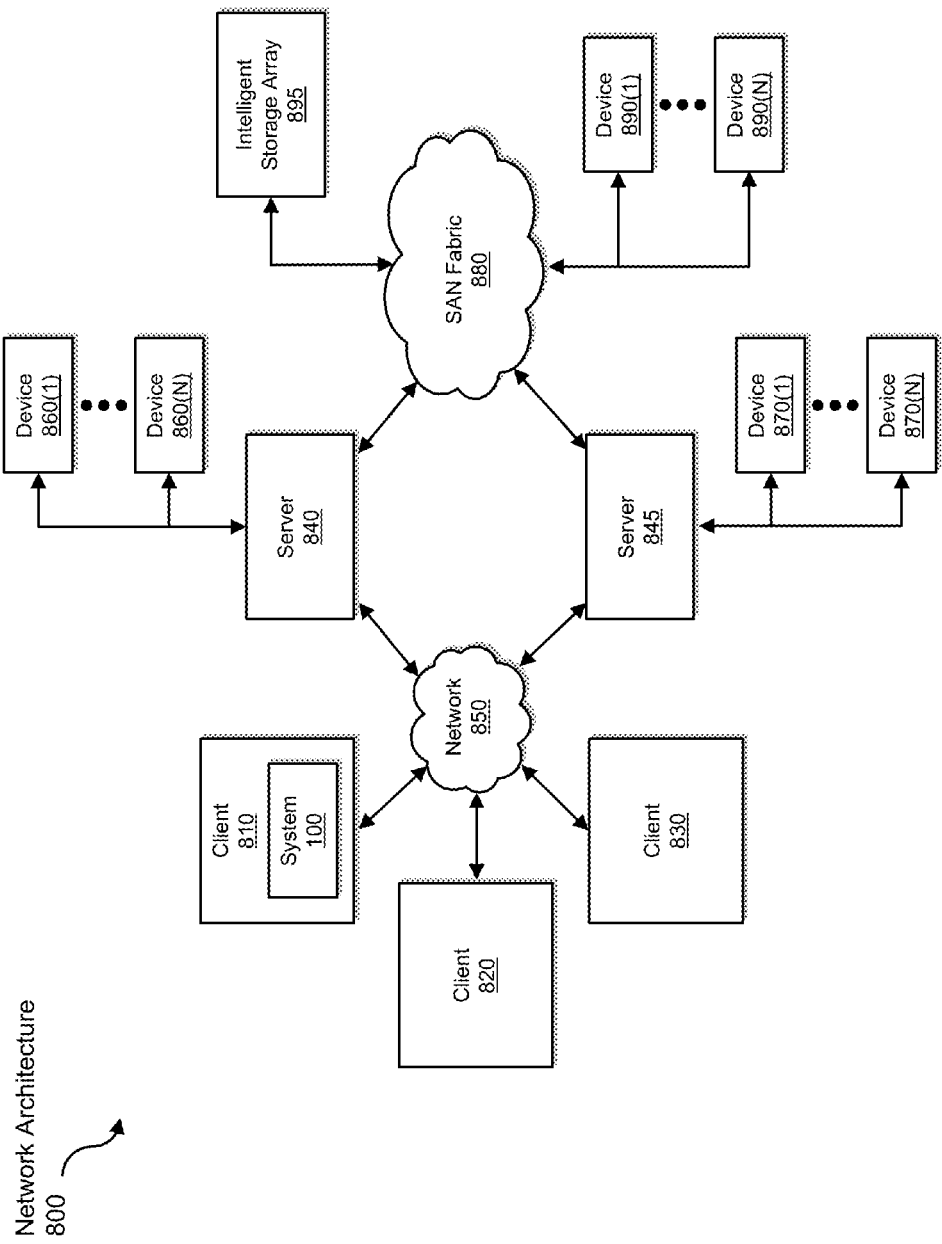
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the identifying, parsing, searching, enhancing, injecting, contextualizing, and displaying steps disclosed herein. All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for enhancing social networking content.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for enhancing social networking content. As another example, one or more of the modules described herein may transform a social networking web page into an enhanced social networking web page.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enhancing social networking content, at least a portion of the method being performed by a computing device comprising at least one processor, the method comprising:

identifying social networking content accessed from a social networking platform;

parsing the social networking content to identify at least one content item that is potentially referenced in at least one of a plurality of social networking platforms that are different from the social networking platform;

searching, based on a juxtaposition of a person and one of a topic, an event, and a time, the plurality of social networking platforms for an additional content item that relates to the content item, wherein the relationship between the additional content item and the content item comprises the juxtaposition;

enhancing the social networking content with the additional content item.

2. The computer-implemented method of claim 1, wherein enhancing the social networking content comprises:

injecting the additional content item into the social networking content;
displaying the social networking content enhanced with the injected additional content item.

3. The computer-implemented method of claim 2, wherein injecting the additional content item into the social networking content comprises contextualizing the content item in the social networking content with the additional content item.

4. The computer-implemented method of claim 1, wherein enhancing the social networking content comprises:
injecting a link to the additional content item into the social networking content;
displaying the social networking content enhanced with the injected link to the additional content item.

5. The computer-implemented method of claim 1, wherein enhancing the social networking content comprises:
injecting a link to a list of search results comprising the additional content item into the social networking content;
displaying the social networking content enhanced with the injected link to the additional content item.

6. The computer-implemented method of claim 1, wherein enhancing the social networking content comprises displaying information relating to the additional content item in a toolbar while displaying the social networking content.

7. The computer-implemented method of claim 1, wherein searching the plurality of social networking platforms for the additional content item that relates to the content item comprises at least one of:
an invitation to the event sent by the person;
an invitation to the event accepted by the person;
a picture of the person relating to the topic;
a review relating to the topic and submitted by the person;
a rating relating to the topic and submitted by the person.

8. The computer-implemented method of claim 1, wherein searching the plurality of social networking platforms comprises:
identifying a user account that accessed the social networking content;
identifying a plurality of user accounts for the plurality of social networking platforms corresponding to a same user as the user account;
identifying a plurality of access credentials for the plurality of user accounts;
searching the plurality of social networking platforms using the plurality of access credentials.

9. A system for enhancing social networking content, the system comprising:
an identification module programmed to identify social networking content accessed from a social networking platform;
a parsing module programmed to parse the social networking content to identify at least one content item that is potentially referenced in at least one of a plurality of social networking platforms that are different from the social networking platform;
a search module programmed to search, based on a juxtaposition of a person and one of a topic, an event, and a time, the plurality of social networking platforms for an additional content item that relates to the content item, wherein the relationship between the additional content item and the content item comprises the juxtaposition;
an enhancement module programmed to enhance the social networking content with the additional content item;
at least one processor configured to execute the identification module, the parsing module, the searching module, and the enhancing module.

10. The system of claim 9, wherein enhancement module is programmed to enhance the social networking content by:
injecting the additional content item into the social networking content;
displaying the social networking content enhanced with the injected additional content item.

11. The system of claim 10, wherein the enhancement module is programmed to inject the additional content item into the social networking content by contextualizing the content item in the social networking content with the additional content item.

12. The system of claim 9, wherein the enhancement module is programmed to enhance the social networking content by:
injecting a link to the additional content item into the social networking content;
displaying the social networking content enhanced with the injected link to the additional content item.

13. The system of claim 9, wherein the enhancement module is programmed to enhance the social networking content by:
injecting a link to a list of search results comprising the additional content item into the social networking content;
displaying the social networking content enhanced with the injected link to the additional content item.

14. The system of claim 9, wherein the enhancement module is programmed to enhance the social networking content by displaying information relating to the additional content item in a toolbar while displaying the social networking content.

15. The system of claim 9, wherein the search module is programmed to search the plurality of social networking platforms for the additional content item that relates to the content item by at least one of:
an invitation to the event sent by the person;
an invitation to the event accepted by the person;
a picture of the person relating to the topic;
a review relating to the topic and submitted by the person;
a rating relating to the topic and submitted by the person.

16. The system of claim 9, wherein the search module is programmed to search the plurality of social networking platforms by:
identifying a user account that accessed the social networking content;
identifying a plurality of user accounts for the plurality of social networking platforms corresponding to a same user as the user account;
identifying a plurality of access credentials for the plurality of user accounts;
searching the plurality of social networking platforms using the plurality of access credentials.

17. A non-transitory computer-readable-storage medium comprising one or more computer-executable instructions that, when executed by at least one processor of a computing device, cause the computing device to:
identify social networking content accessed from a social networking platform;
parse the social networking content to identify at least one content item that is potentially referenced in at least one of a plurality of social networking platforms that are different from the social networking platform;
search, based on a juxtaposition of a person and one of a topic, an event, and a time, the plurality of social networking platforms for an additional content item that relates to the content item, wherein the relationship between the additional content item and the content item comprises the juxtaposition;
enhance the social networking content with the additional content item.

18. The computer-readable-storage medium of claim 17, wherein the one or more computer-executable instructions cause the computing device to enhance the social networking content by causing the computing device to:
inject the additional content item into the social networking content;
display the social networking content enhanced with the injected additional content item.

19. The computer-readable-storage medium of claim 18, wherein the one or more computer-executable instructions cause the computing device to inject the additional content item into the social networking content by causing the computing device to contextualize the content item in the social networking content with the additional content item.

20. The computer-readable-storage medium of claim 17, wherein the one or more computer-executable instructions cause the computing device to enhance the social networking content by causing the computing device to:
inject a link to the additional content item into the social networking content;
display the social networking content enhanced with the injected link to the additional content item.

* * * * *

UNITED STATES PATENT AND TRADEMARK OFFICE
CERTIFICATE OF CORRECTION

PATENT NO. : 9,020,957 B1  
APPLICATION NO. : 13/408497  
DATED : April 28, 2015  
INVENTOR(S) : Scott D. Schneider and Hemant Puri Page 1 of 1

It is certified that error appears in the above-identified patent and that said Letters Patent is hereby corrected as shown below:

In the claims

Claim 10, at column 16, line 1, should read:
The system of claim 9, wherein the enhancement module is Signed and Sealed this
Twenty-fourth Day of November, 2015

Michelle K. Lee
*Director of the United States Patent and Trademark Office*